J. NELSON.
ANTISKIDDING AND TRACTION DEVICE.
APPLICATION FILED JULY 29, 1918.

1,294,523.

Patented Feb. 18, 1919.
3 SHEETS—SHEET 1.

INVENTOR
John Nelson
BY John A. Naismith
HIS ATTORNEY

J. NELSON.
ANTISKIDDING AND TRACTION DEVICE.
APPLICATION FILED JULY 29, 1918.
1,294,523.
Patented Feb. 18, 1919.
3 SHEETS—SHEET 2.
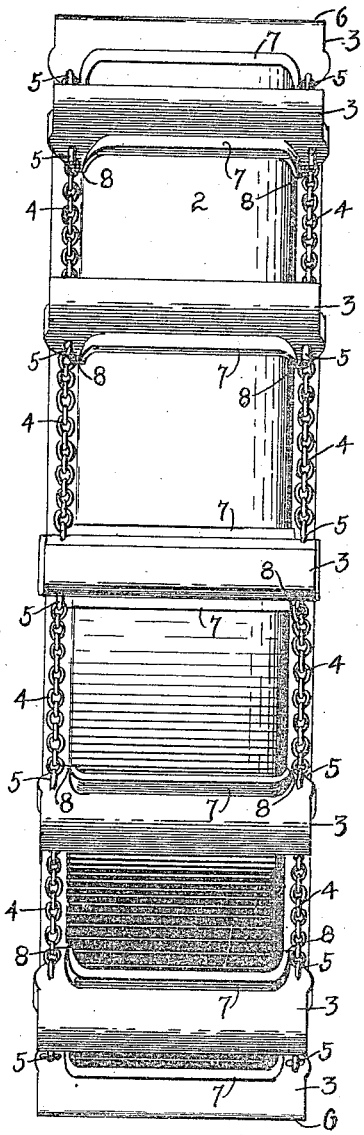
FIGURE 2
FIGURE 7
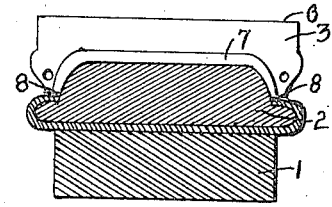
FIGURE 3
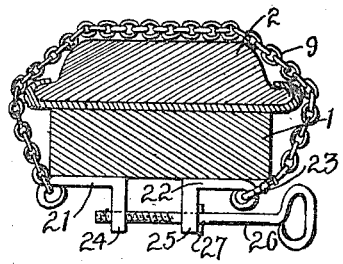
FIGURE 4
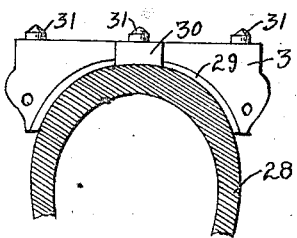
FIGURE 5
FIGURE 6
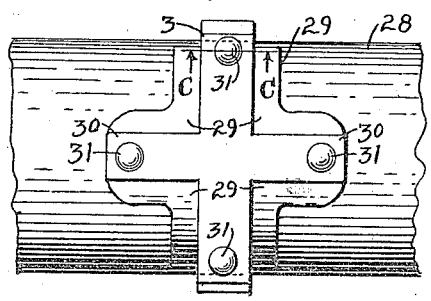
INVENTOR
John Nelson
BY John A. Naismith
HIS ATTORNEY J. NELSON.
ANTISKIDDING AND TRACTION DEVICE.
APPLICATION FILED JULY 29, 1918.
1,294,523.
Patented Feb. 18, 1919.
3 SHEETS—SHEET 3.
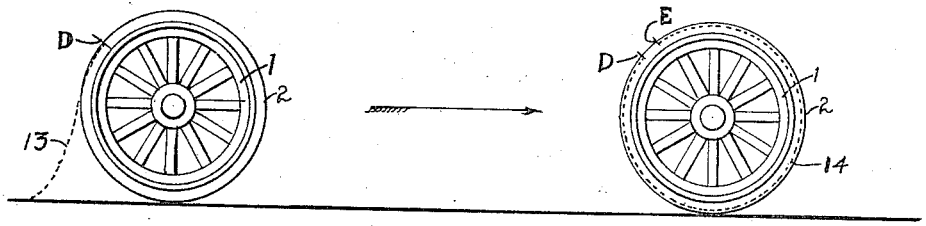
FIGURE 15
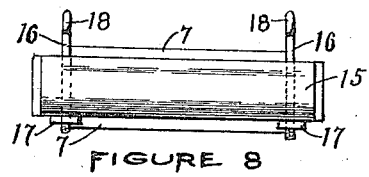
FIGURE 8
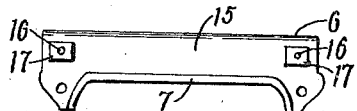
FIGURE 9
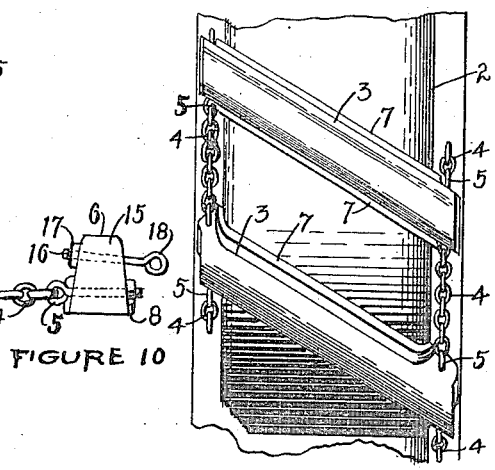
FIGURE 10
FIGURE 14
FIGURE 11
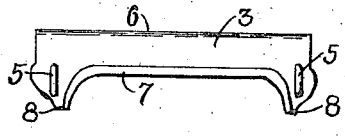
FIGURE 12
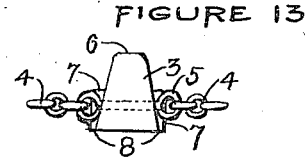
FIGURE 13
INVENTOR
John Nelson
BY John A. Naismith
HIS ATTORNEY

UNITED STATES PATENT OFFICE.

JOHN NELSON, OF SAN JOSE, CALIFORNIA.

ANTISKIDDING AND TRACTION DEVICE.

1,294,523. Specification of Letters Patent. Patented Feb. 18, 1919.

Application filed July 29, 1918. Serial No. 247,225.

*To all whom it may concern:*

Be it known that I, JOHN NELSON, a citizen of the United States, residing near San Jose, in the county of Santa Clara and State of California, have invented certain new and useful Improvements in Antiskidding and Traction Devices, of which the following is a specification.

My invention relates to that class of devices attachable to motor vehicle wheels for the purpose of securing additional traction in unstable ground and for preventing skidding of the wheels on slippery surfaces.

The object of my invention is to provide a device of the character indicated that will not only embody the desired antiskidding and traction properties, but that will do a minimum amount of injury to the tire and that can be quickly and easily placed upon and removed from a wheel and satisfactorily adjusted and tightened as slackness develops, without the use of special tools.

With these and other objects in view my invention consists of the novel and useful provision, formation, construction, combination and relative arrangement of parts, members and features, all as hereinafter described, shown in the drawings, and finally pointed out in the claim.

In the drawings:—

Fig. 2 is an edge elevation of a wheel with my improved device in position thereon.

Fig. 3 is a sectional view on line A—A of Fig. 1 with the connecting elements and bolts removed.

Fig. 4 is a sectional view through a wheel felly and tire showing another form of anchor in position thereon.

Fig. 5 is a sectional view through a portion of a pneumatic tire with a modified form of shoe in position thereon.

Fig. 6 is a plan view of the shoe shown in elevation in Fig. 5.

Fig. 7 is a sectional view on line C—C of Fig. 6, part broken away.

Fig. 8 is a plan view of the terminal adjusting shoe with adjusting bolts therein.

Fig. 9 is a side elevation of the terminal adjusting shoe illustrated in Fig. 8.

Fig. 10 is an end elevation of the terminal adjusting shoe shown in Fig. 9 with adjusting bolts and tie bolts in position.

Fig. 11 is a plan view of a typical shoe with tie bolts in position.

Fig. 12 is a side elevation of the typical shoe shown in Fig. 11.

Fig. 13 is an end elevation of the typical shoe shown in Fig. 12 with portions of connecting elements attached thereto.

Fig. 14 is an edge elevation of a portion of a wheel with a modified form of shoe in position thereon.

Fig. 15 is a diagrammatical illustration of a preferred method of applying the device to a wheel.

Similar characters of reference indicate similar parts throughout the several views.

Figure 1:
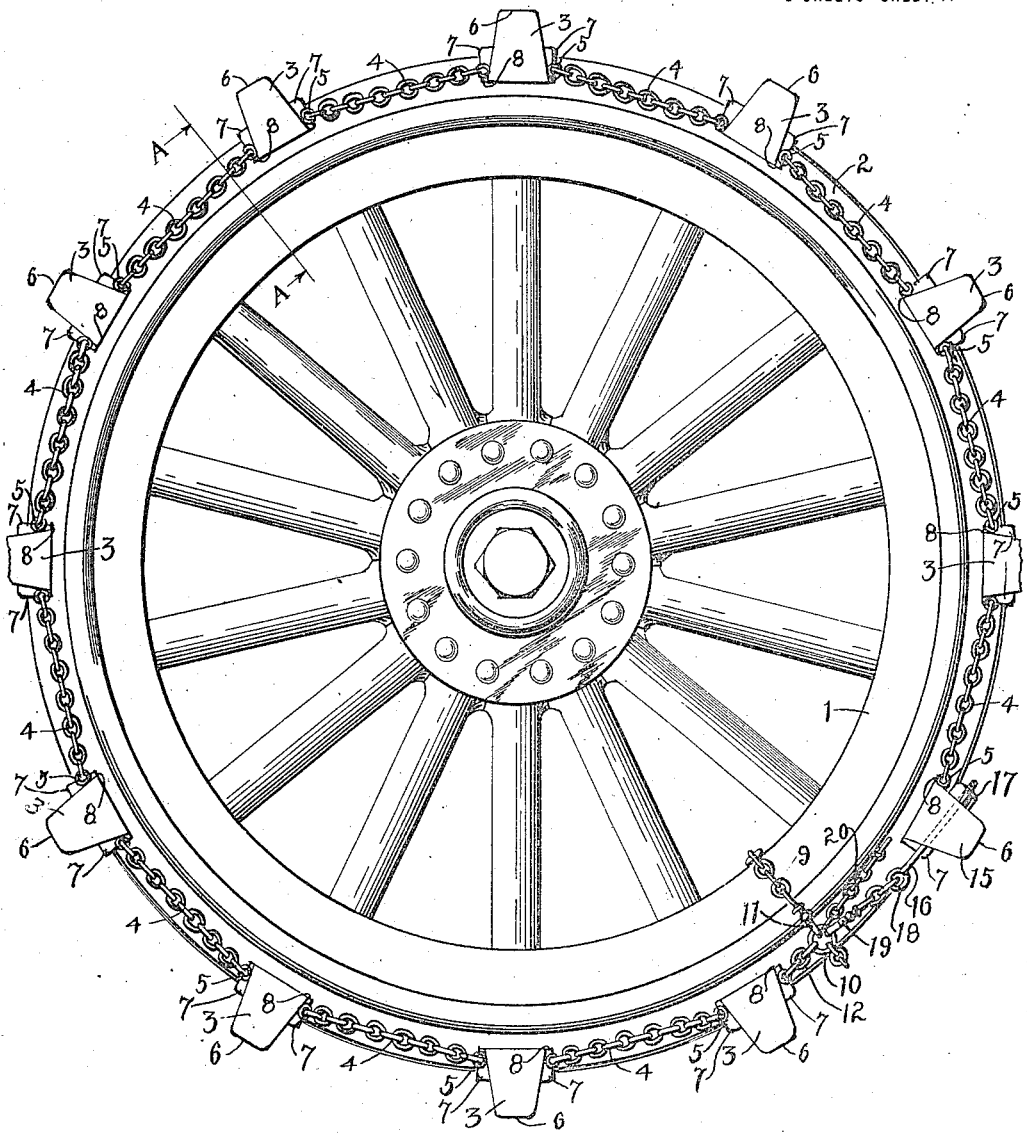
Figure 1 is a side elevation of an automobile wheel with my improved device in position thereon, parts broken away.

Referring now more particularly to the drawings, 1 indicates a wheel having a rubber tire 2 positioned thereon and upon which my device is fastened.

My improved antiskidding and traction device consists of a plurality of traction shoes 3 equally spaced about the periphery of the wheel by means of chain elements 4 secured to tie-bolts 5 secured in shoes 3 as shown. Each of the shoes 3 is, in the present instance, formed with a substantially flat traction surface as shown at 6 and is shaped on its under edge to conform with the shape of the tire upon which it is to be placed. This under edge is made broad to give additional bearing upon the tire by the addition of flanges 7, the said flanges 7 also conforming to the shape of the tire and terminating at a point inwardly of the tire tread with the ends of the shoe proper as shown at 8.

As a means for securing this device to the wheel the following described form of anchor is preferred. A chain 9 sufficiently long to encircle the wheel tire and felly is provided with a ring 10 on one end thereof and a snap hook 11 on the other end thereof. Ring 10 is also connected to one shoe 3 by a short chain element as 12. When this anchor is secured as shown in Fig. 1 and as above described, it is clear that any tensional strain applied to chain element 12 will serve only to bind the anchor tighter upon the tire and felly of the wheel. In this improved form of antiskidding device all of shoes 3 may be made uniform in shape and size and provided with tie-bolts 5 hereinbefore referred to, each bolt having an eye formed on each end to engage one end of a chain element 4.

Considering one of the shoes 3 above referred to as being connected to ring 10 by chain element 12 and as the first shoe of the series, the last or terminal shoe of the series will be that one indicated by the numeral 15. Shoe 15 varies from the other shoes in that the tie-bolts 5 have but one eye each, and also in that another pair of bolts as 16 are placed therein. Bolts 16 are threaded to engage nuts 17 and are provided with eyes 18, each eye 18 having a snaphook 19 connected thereto, the said snaphook 19 being adapted to engage ring 10 or one of the links of chain element 20, the said chain element 20 being connected at one end to ring 10.

In placing this device on a wheel the anchor 9 is secured in position at a point as D in Fig. 15, the device hanging loosely from that point as at 13. The vehicle is now moved forwardly as indicated by the arrow, until point D has completed a circle and drawn the device up onto the wheel, the terminal shoe 15 taking the position indicated by the letter E, the encircling device being at 14. It now only remains to attach the snap-hook 19 to ring 10 (or to a link of chain element 20) and the device will be in position for use. If, however, this adjustment does not bind the device sufficiently tight to the tire then the slack can be taken up by tightening up nuts 17, this double adjustment rendering the device easily, quickly and accurately adjustable to the tire. The placing and adjusting of this device as above set forth can be done while the operator is standing in a nearly upright position and consequently is working some distance from the mud in the street.

Fig. 4 illustrates another form of anchor in which chain 9 is attached at one end to a member 21 and at the other end to a member 22 by means of snap-hook 23. Members 21 and 22 are provided with flat surfaces to engage the under side of the wheel felly and have parallel arms 24 and 25 respectively.

Arm 24 is tapped to receive the threaded end of rod 26 which passes through a bore in arm 25 and is provided with a pin 27, these members operating to draw members 21 and 22 together and tighten chain 9 when rod 26 is turned in one direction.

In Fig. 5 a shoe 3 is shown shaped to conform to the curve of a pneumatic tire 28 and provided with wide flanges 29 to secure additional bearing surface. I have also here shown that shoe 3 may have arms 30 diverging therefrom to secure additional traction, and calks 31 may be positioned therein as additional guard against slipping.

In Fig. 14 I have shown that shoes 3 may be formed to lie angularly with respect to the tire, thereby eliminating the bumping occasioned by transversely positioned shoes.

It is understood, of course, that while I have herein shown and described the preferred embodiment of my invention, that all desirable changes may be made that come within the scope of the appended claim.

Having thus described my invention, what I claim as new and desire to secure by Letters Patent, is:—

A device to be arranged upon the tire and felly of a wheel and comprising a plurality of circumferentially spaced shoes for said tire, an anchor encircling said tire and felly between two of said shoes, permanent connections between said anchor and one of said shoes, adjusting devices mounted in the other of said shoes, flexible elements connected to said adjusting devices, means secured to said flexible elements for detachably connecting the same to said anchor, and flexible elements connecting each of the remaining shoes with the shoes adjacent thereto.

In testimony whereof I have hereunto affixed my signature this 22nd day of July, 1918.

JOHN NELSON.